US008625185B2

(12) United States Patent
Ide

(10) Patent No.: US 8,625,185 B2
(45) Date of Patent: Jan. 7, 2014

(54) LIGHT CONTROLLING APPARATUS INCLUDING AT LEAST ONE MAGNET AND AT LEAST ONE COIL AND OPTICAL SYSTEM

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 378 days.

(21) Appl. No.: 12/828,620

(22) Filed: Jul. 1, 2010

(65) Prior Publication Data

US 2011/0002023 A1  Jan. 6, 2011

(30) Foreign Application Priority Data

Jul. 3, 2009  (JP) ................................. 2009-158644

(51) Int. Cl.
*G02B 26/02* (2006.01)

(52) U.S. Cl.
USPC .......................................... 359/233; 359/230

(58) Field of Classification Search
None
See application file for complete search history.

(56) References Cited

U.S. PATENT DOCUMENTS

| 3,277,772 | A | * | 10/1966 | Atwood ..................... 359/210.1 |
| 2002/0034390 | A1 | * | 3/2002 | Naganuma ..................... 396/452 |
| 2004/0223074 | A1 | * | 11/2004 | Takada .......................... 348/360 |

FOREIGN PATENT DOCUMENTS

| JP | 58-181027 A | 10/1983 |
| JP | 8-94905 A | 4/1996 |
| JP | HEI 10-20360 | 1/1998 |
| JP | 2002-341399 A | 11/2002 |
| JP | 2004-45652 A | 2/2004 |

* cited by examiner

*Primary Examiner* — Stephone B Allen
*Assistant Examiner* — Jyotsna Dabbi
(74) *Attorney, Agent, or Firm* — Scully, Scott, Murphy & Presser, P.C.

(57) ABSTRACT

A light controlling apparatus includes a substrate having an aperture, a light controlling section which includes at least one incident-light controlling means, having a magnet joined to a position of a center of rotation, and which rotates in a plane perpendicular to an optical axial direction, on the substrate, and at least one coil which imparts a rotational force to the magnet. The incident-light controlling means is displaced to a retracted position of being retracted from the position of the aperture, by supplying an electric power supply, and in the light controlling apparatus in which, incident light which passes through the aperture is controlled, the coil is disposed to be extended in a direction parallel to the optical axis.

15 Claims, 7 Drawing Sheets

LIGHT CONTROLLING APPARATUS INCLUDING AT LEAST ONE MAGNET AND AT LEAST ONE COIL AND OPTICAL SYSTEM

CROSS-REFERENCE TO RELATED APPLICATION

The present application is based upon and claims the benefit of priority from the prior Japanese Patent Application No. 2009-158644 filed on Jul. 3, 2009; the entire contents of which are incorporated herein by reference.

BACKGROUND OF THE INVENTION

1. Field of the Invention

The present invention relates to a light controlling apparatus and an optical system which are used in a small-size image pickup equipment.

2. Description of the Related Art

Various types of light controlling apparatuses have hitherto been used. As one of the types thereof, a plug-in type light controlling apparatus in which, a single or a plurality of incident-light controlling means is displaced mutually inside and outside an optical path by an electromagnetic driving source, and optical characteristics of incident light which passes through the optical path is changed, is available. In recent years, with an achievement of high-quality image of a portable equipment having an image pickup function and a small-size image pickup equipment such as a micro video scope, with regard to optical elements such as a lens, an aperture, and an optical filter, there has been increasing demand for an application of a focusing lens, a variable aperture, and a variable special characteristic filter instead of a conventional fixed focusing lens, a fixed aperture stop, and a fixed special characteristic filter.

As the abovementioned plug-in type light controlling apparatus has a simple structure, it has been gathering attention as a light controlling apparatus which is suitable for small sizing, which in turn, is suitable for such small-size image pickup equipment.

An example of such plug-in type light controlling apparatus suitable for small-sizing has been disclosed in Japanese Patent Application Laid-open Publication No. Hei 10-20360, in which, a diaphragm plate is fixed to a rotor which is polarized to bipolarity, via a shaft, and the rotor is inserted through a rotating hole into a coil which has been formed to be ring-shaped, and is fixed to be freely rotatable by a shaft attachment which is formed in an upper cover and a lower cover.

However, in a structure disclosed in Japanese Patent Application Laid-open Publication No. Hei 10-20360, an area in which the coil can be formed is limited to be more than a diameter of an opening formed in the upper cover and the lower cover, and within an outer peripheral diameter of the upper cover and the lower cover.

For reducing further a diameter of the light controlling apparatus, it is necessary to shorten a coil-length or to reduce the number of turns of the coil together with the contraction of the area in which the coil can be formed. This leads to a degradation of magnetic field generated in the coil, thereby leading to a degradation of a rotating torque of the diaphragm plate, which hinders a stable drive.

Moreover, in reducing further the diameter of the light controlling apparatus, not only that the area in which the coil can be formed is reduced but also there may arise a problem that there is no space to provide the coil in first place.

SUMMARY OF THE INVENTION

The present invention is made in view of the abovementioned circumstances, and an object of the present invention to provide a light controlling apparatus of a small size which is used in a small-size image pickup equipment, of which, the diameter is reduced further, and which is capable of providing a stable drive.

To solve the abovementioned issues and to achieve the object, there is provided a light controlling apparatus including a substrate having an aperture, a light controlling section which includes at least one incident-light controlling means, having a magnet joined to a position of a center of rotation, and which rotates in a plane perpendicular to an optical axial direction, on the substrate, and at least one coil which imparts a rotational force to the magnet, and the incident-light controlling means is displaced to a position of the aperture and a retracted position of being retracted from the position of the aperture, by supplying an electric power, and in the light controlling apparatus in which, incident light which passes through the aperture is controlled, the coil is disposed to be extended in a direction parallel to an optical axis.

According to a preferable aspect of the present invention, it is desirable that a total length of the coil is set to a length which enables to achieve a magnetic field, which imparts to the magnet a rotational force for displacing the incident-light controlling means.

According to a preferable aspect of the present invention, it is desirable that the total length of the coil is longer than an outer peripheral length of the substrate having the aperture.

According to a preferable aspect of the present invention, it is desirable that for an aspect ratio of a cross-sectional shape in a plane perpendicular to an optical axial direction of the coil, a length in a circumferential direction is longer as compared to a length in a radial direction of a virtual circle having an optical axis as a center.

According to a preferable aspect of the present invention, it is desirable that a core of the coil is folded inward of a plane perpendicular to the optical axis, at a front-end portion.

According to a preferable aspect of the present invention, it is desirable that a core of the coil has a flat surface portion which is extended in a plane perpendicular to the optical axis, at a front-end portion.

According to a preferable aspect of the present invention, it is desirable that an aperture is formed in the incident-light controlling means.

According to a preferable aspect of the present invention, it is desirable that a lens is formed in the incident-light controlling means.

According to a preferable aspect of the present invention, it is desirable that an optical filter is formed in the incident-light controlling means.

According to the present invention, there can be provided an optical system which includes the abovementioned light controlling apparatus, and at least one first optical element is disposed parallel to the coil.

According to a preferable aspect of the present invention, it is desirable that the first optical element is held by a second lens frame which is provided separately from a first lens frame which holds the light controlling section and a second optical element.

According to a preferable aspect of the present invention, it is desirable that the second lens frame is joined to the light controlling section.

According to a preferable aspect of the present invention, it is desirable that the coil is held by the second lens frame.

According to a preferable aspect of the present invention, it is desirable that the first optical element has a notch, and the first optical element is disposed parallel to the coil to include the coil in a notch area of the first optical element.

According to a preferable aspect of the present invention, it is desirable that the coil is disposed to be extended in a direction parallel to the optical axial direction, out of the first lens frame which holds the light controlling section.

DETAILED DESCRIPTION OF THE INVENTION

Exemplary embodiments of a light controlling apparatus and an optical system according to the present invention will be described below in detail by referring to the accompanying diagrams. However, the present invention is not restricted to the embodiments described below.

First Embodiment

In a first embodiment, the description of a light controlling apparatus will be made by citing an example of a structure in which, a variable aperture which regulates a light beam passing through an aperture is driven by using an electromagnetic actuator, by displacing a diaphragm plate in which the aperture is formed, to a position in the optical path, and a position away from the optical path.

Figure 1:
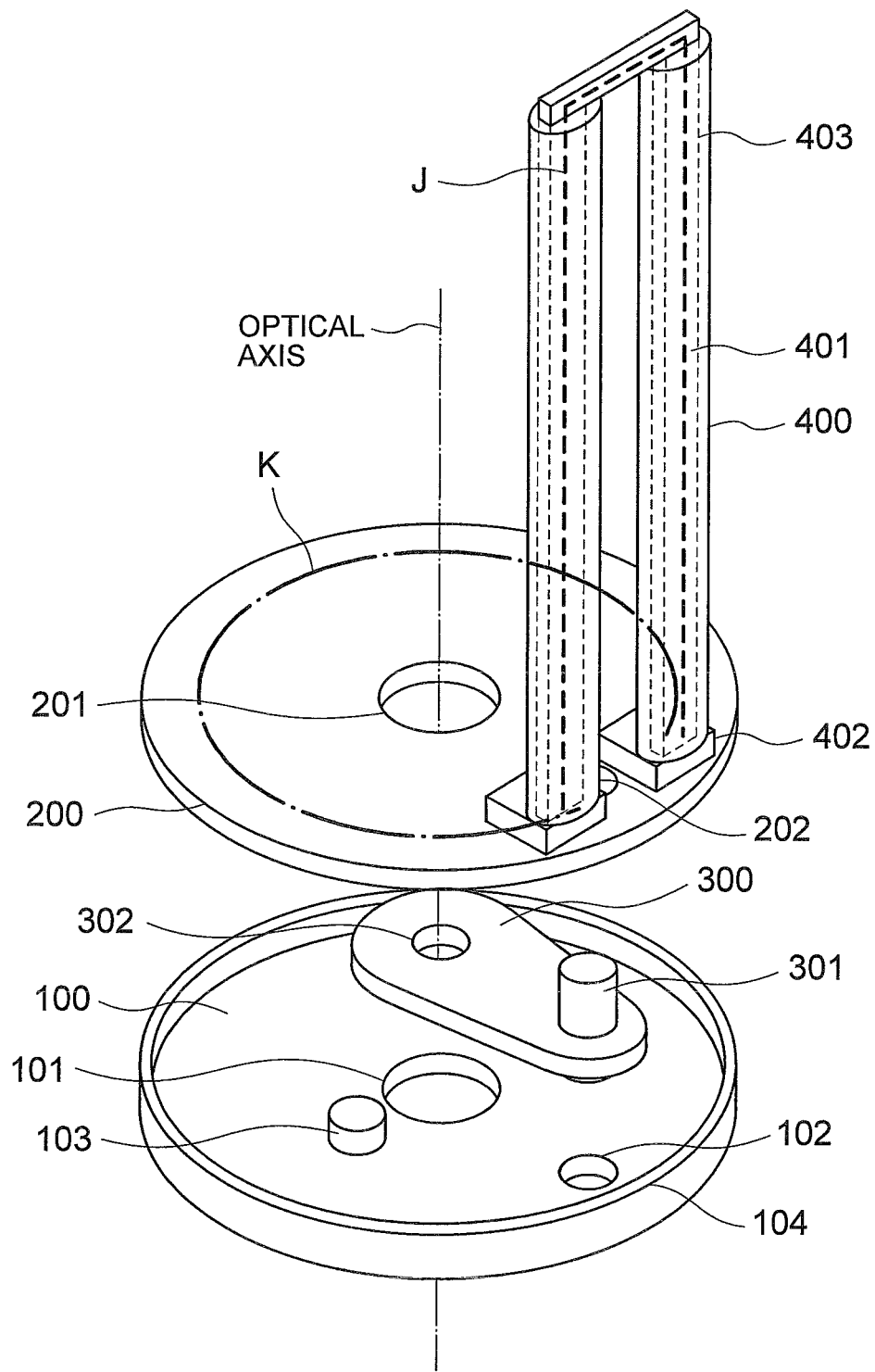
FIG. 1 is an exploded perspective view of a light controlling apparatus according to a first embodiment of the present invention.

A structure of the light controlling apparatus according to the first embodiment will be described below by using FIG. 1. FIG. 1 is an exploded perspective view of the light controlling apparatus according to the first embodiment. As shown in FIG. 1, the light controlling apparatus of the first embodiment includes a lower substrate 100 in which, a first aperture 101, a first shaft-receiving hole 102, a positioning portion 103, and a regulating portion 104 are formed, an upper substrate 200 in which, a second aperture 201 and a second shaft-receiving hole 202 are formed, a diaphragm plate 300 in which, a third aperture 302 is formed, and to which, a shaft member 301 made of a circular-cylindrical shaped magnet is joined, and a coil 400 in which, coil wire 401 is wound around a core 403, and a bending portion 402 is formed at two ends of the core 403.

Each of the structural members will be described below in detail.

The first aperture 101 formed in the lower substrate 100 and the second aperture 201 formed in the upper substrate 200 become an optical path through which the incident light passes, with a center of the aperture as an optical axis. The first aperture 101 and the second aperture 201 are formed to have the same diameter or the different diameters, and the diameter of the apertures (when the aperture diameters differ, the smaller diameter is an aperture diameter) is an open aperture diameter in the light controlling apparatus. Moreover, the regulating portion 104 formed in the lower substrate 100 is a member which regulates a gap between lower substrate 100 and the upper substrate 200.

The third aperture 302 which is smaller than the first aperture 101 and the second aperture 201 formed in the lower substrate 100 and the upper substrate 200 respectively, is formed in the diaphragm plate 300. Moreover, the shaft member 301 made of the circular cylindrical shaped magnet is joined by a method such as press fitting. The shaft member 301 is engaged in the first shaft-receiving hole 102 and the second shaft-receiving hole 202 formed in the lower substrate 100 and the upper substrate 200 respectively, and the diaphragm plate 300 is rotatably installed with the shaft member 301 as the axis of rotation.

An operable area of the diaphragm plate 300, in an optical axial direction, is regulated by the lower substrate 100 and the upper substrate 200, and in a direction of rotation, is regulated by the regulating portion 104 and the positioning portion 103 formed in the lower substrate 100. Moreover, the diaphragm plate 300 is formed such that, at a position making a contact with the position member 103, the center of the third aperture coincides with the optical axis.

The coil 400 has the coil wire 401 wound around the core 403 made of a magnetic material, extending in a direction parallel to the optical axis. The bending portion 402 is formed at both ends of the core 403. The bending portions 402 are face-to-face to dispose the shaft member 301 joined to the diaphragm plate 300 in between the bending portions 402. The bending portions 402 may be provided as separate bodies provided that the bending portions are coupled magnetically with the core 403, or may be formed by folding a front end of the core 403.

Here, the total length J of the coil 400 is an important factor which regulates an electric field generated in the bending portions 402, like the other factors such as the number of turns of the coil wire 401, an amount of electric power supplied to the coil wire 401, and properties of a material of the core 403. The length J is to be set to a length which enables to achieve a magnetic field sufficient for imparting a rotational force for displacing the diaphragm plate 300, to the shaft member 301 made of the circular cylindrical shaped magnet, along with the abovementioned factors. Moreover, the total length J of the coil 400 is set to be longer than an outer peripheral length K of the lower substrate 100 and the upper substrate 200.

Figure 2A:
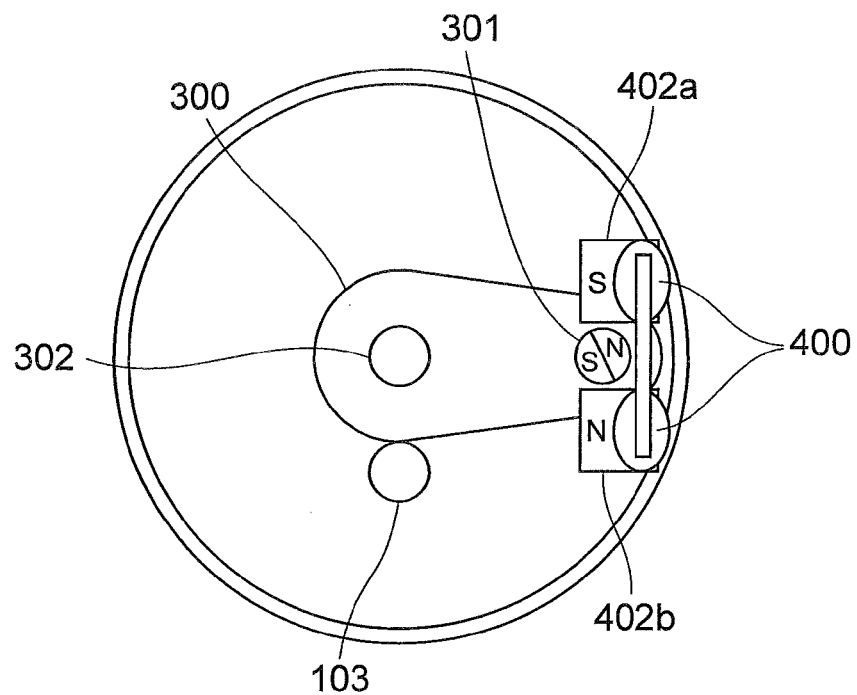
FIG. 2A and FIG. 2B are diagrams showing top views (seen transparently) through an upper substrate.
Figure 2B:
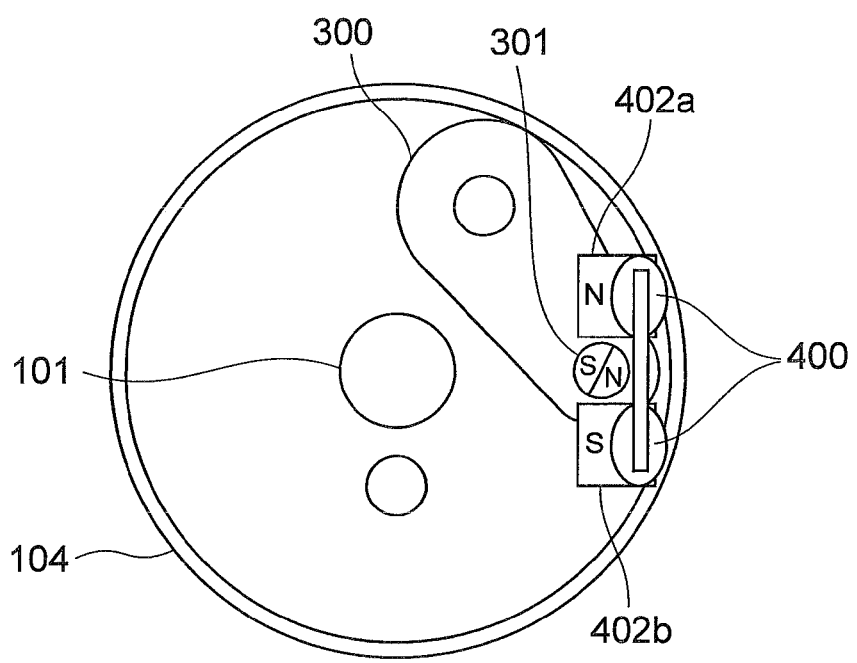

Next, an operation of the light controlling apparatus of the first embodiment will be described below by referring to FIG. 2A and FIG. 2B. FIG. 2A and FIG. 2B, show top views seen transparently through the upper substrate 200, in the light controlling apparatus of the first embodiment.

The shaft member 301 which is joined to the diaphragm plate 300 is made of the circular cylindrical shaped magnet, and is magnetized to have S polarity and N polarity in a direction from the center of the third aperture 302 formed in the diaphragm plate 300 toward the shaft member 301.

Whereas, the coil 400 has the coil wire 401 wound around the core 403 made of a magnetic material, and by a current flowing through the coil wire 401, the bending portions 402a and 402b formed at the two ends respectively of the core 403 are magnetized mutually to the S polarity and the N polarity. Furthermore, due to magnetic attraction and repulsion of the magnetic field generated by the coil 400 and the magnetic field of the shaft member 301, rotational force is generated in the shaft member 301, and the diaphragm plate 300 rotates with the shaft member 301 as a center of rotation. The direction of rotation can be controlled by a direction of the current which flows through the coil wire 401.

Here, the shaft member 301 is magnetized as described above, and as shown in FIG. 2A, when the bending portion 402a is magnetized to S polarity and the bending portion 402b is magnetized to N polarity, rotational force in the counterclockwise direction in the diagram acts on the diaphragm plate 300. The diaphragm plate 300 stops at a position where the diaphragm plate 300 has made a contact with the positioning portion 103. In this state, the diaphragm plate 300 closes the first aperture 101 and the second aperture 201, and by the center of the third aperture 302 formed in the diaphragm plate 300 coinciding with the optical axis, the diameter of the optical path through which the incident light passes becomes the third aperture 302.

Moreover, as shown in FIG. 2B, when the bending portion 402a is magnetized to N polarity and the bending portion 402b is magnetized to S polarity, rotational force in the clockwise direction in the diagram acts on the diaphragm plate 300. The diaphragm plate 300 stops at a position where the diaphragm plate 300 has made a contact with the regulating portion 104. The diaphragm plate 300 is retracted from the first aperture 101 and the second aperture 201, and the aperture diameter becomes the first aperture 101 and the second aperture 201.

In this manner, by controlling the direction of the electric power supplied to the coil 400, it is possible to rotate the diaphragm plate 500, and to control in two stages the diameter of the optical path through which the incident light passes.

Next an effect of the light controlling apparatus of the first embodiment will be described below.

As a method of forming a coil in the light controlling apparatus, when the coil is formed by extending along a surface of a substrate, an area in which the coil can be formed is restricted to be not less than a diameter of an aperture in the substrate, and is not more than an outer diameter of the substrate. Accordingly, along with further reduction in a diameter of the light controlling apparatus, it is necessary to shorten the length of the coil or to reduce the number of turns of the coil along with the contraction of the area in which the coil can be formed. This leads to a degradation of magnetic field generated in coil, thereby leading to a degradation of a rotating torque of the diaphragm plate, which hinders a stable drive. Moreover, there may be a problem that a case in which the desired coil is provided cannot be secured.

Whereas, the light controlling apparatus of the first embodiment has a structure in which, the coil is formed by extending in a direction parallel to the optical axis. Consequently, since the area in which the coil is formed does not depend on an outside dimension (outer diameter of the substrate) of the light controlling apparatus, it is possible to set freely the coil length even when the diameter of the light controlling apparatus is made smaller.

As it has been mentioned above, in the light controlling apparatus of the first embodiment, even when the diameter of the light controlling apparatus is reduced further, it is possible to secure the coil length, and it is possible to avoid the degradation of the magnetic field generated in the coil, and to avoid the degradation of the power generated by an electromagnetic actuator, thereby making it possible to drive the light controlling apparatus stably.

Moreover, by replacing the diaphragm plate in the first embodiment by an optical lens, it is also possible to use as an optical lens attaching and detaching apparatus.

Furthermore, by replacing the diaphragm plate in the first embodiment by an optical filter, it is also possible to use as an optical filter attaching and detaching apparatus which changes an amount of light transmitted or a pass wavelength band.

Second Embodiment

In a second embodiment, an optical system will be described by citing an example of an optical system in which alight controlling apparatus is used. In the light controlling apparatus of the second embodiment, a variable aperture which regulates a light beam passing through an aperture by displacing a diaphragm plate in which the aperture is formed, to a position of an optical path and away from the optical path is driven by using an electromagnetic actuator.

Figure 3:
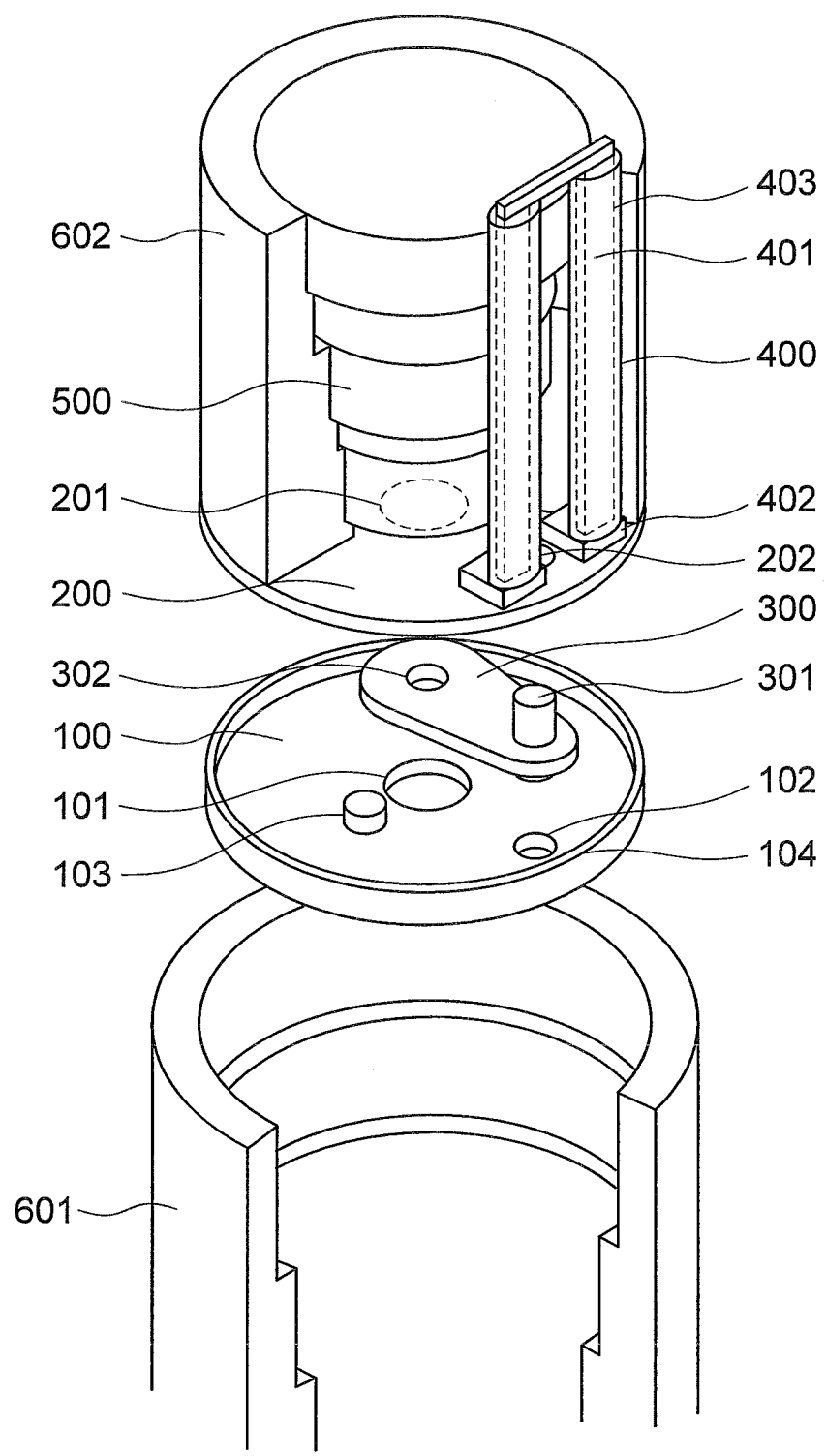
FIG. 3 is an exploded perspective view of an optical system according to a second embodiment of the present invention.

A structure of the optical system according to the second embodiment will be described below by using FIG. 3. FIG. 3 shows an exploded perspective view of the optical system according to the second embodiment.

A lens group 500 (corresponds to a first optical element) as shown in FIG. 3 is joined to a second lens frame 602, and respective distances and an optical axis position are regulated. A second lens frame 602 is joined to the upper substrate 200 of the light controlling apparatus such that an optical axis of the light controlling apparatus and an optical axis of the lens group coincide.

Moreover, the coil 400 is joined directly to the upper substrate 200. The structure may be such that the coil 400 is joined indirectly to the upper substrate 200 by being joined to the second lens frame 602. Furthermore, the structure may be such that a lens group (not shown in the diagram: corresponds to a second optical element) other than the lens group 500 is joined to the first lens frame 601, and the first lens frame 601 and the light controlling apparatus are joined such that an optical axis of the light controlling apparatus and the lens group 500 and an optical axis of the lens group other than the lens group 500 coincide.

Figure 4A:
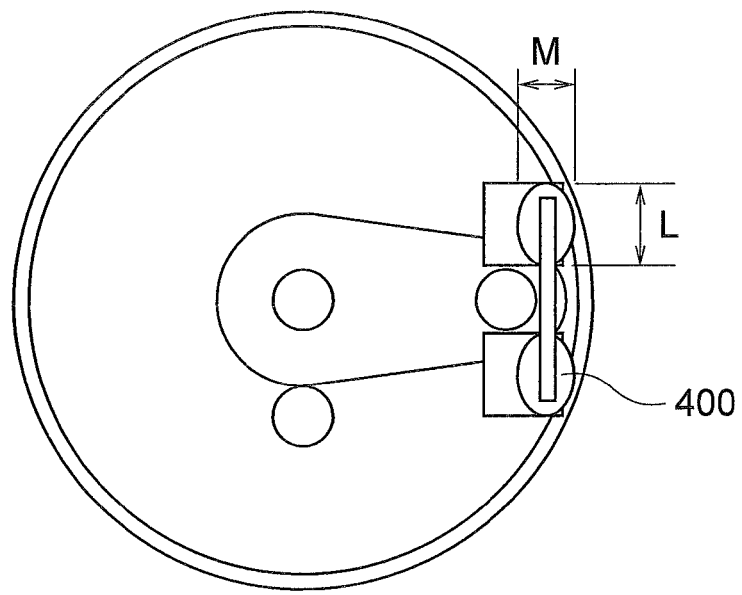
FIG. 4A and FIG. 4B are diagrams describing a cross-sectional shape of a coil.
Figure 4B:
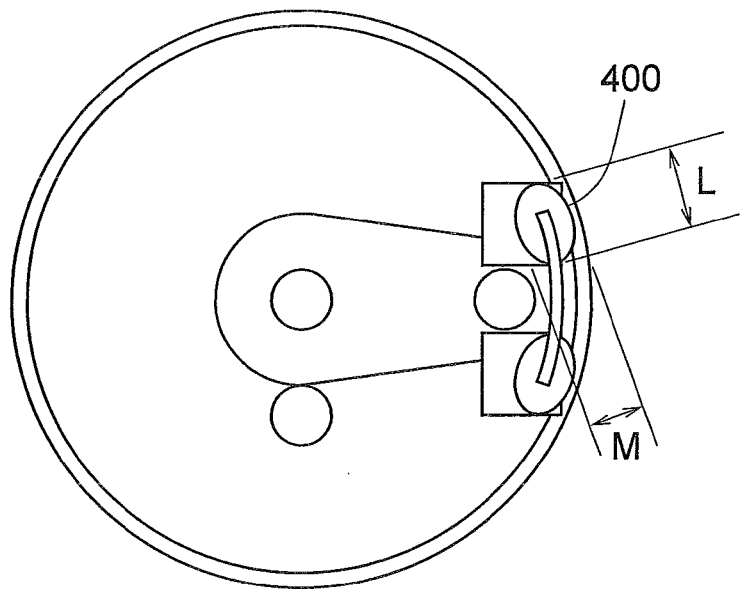

FIG. 4A and FIG. 4B are diagrams describing a cross-sectional shape of the coil. As shown in FIG. 4A, an aspect ratio thereof is to be taken into consideration. A length L along a circumferential direction of a virtual circle having the optical axis as a center is set to be longer than a length M along a radial direction of the virtual circle.

Furthermore, when the coil 400 is disposed along a circumference of the virtual circle having the optical axis as a center as shown in FIG. 4B, it possible to have even wider area for disposing the lens group 500 in the second lens frame 602.

Next an effect of the optical system according to the second embodiment will be described below.

In a case of using the light controlling apparatus generally for an optical application, other lenses and image pickup elements etc. of the light controlling apparatus are arranged in order along the optical axial direction. Here, when the light controlling apparatus, lenses, and optical elements are closed as a separate functional unit, both the reduction of a diameter in the radial direction of the light controlling apparatus and the thinning in the optical axial direction are indispensable for small sizing of the optical system.

On the other hand, in optical system in the second embodiment, limitations on the thinning in the optical axial direction of the light controlling apparatus are relaxed by considering the overall optical system as one functional unit. In other words, by forming the coil to be extended in the direction parallel to the optical axis and also disposing a lens parallel to the coil, the light controlling apparatus and the lenses are assembled three-dimensionally.

In this manner, in the light controlling apparatus of the second embodiment, even when the size of the light controlling apparatus is made further smaller, it is possible to secure the coil length, and it is possible to avoid the degradation of the magnetic field developed by the coil, thereby making it possible to avoid decline in the power generated by the electromagnetic actuator, which enables to drive the light controlling apparatus stably.

Moreover, it is possible to reduce effectively the thickness to the minimum in the optical axial direction, which contributes to the optical characteristics of the light controlling apparatus, and to improve the degree of freedom of optical designing. Furthermore, by joining the lens group which is disposed parallel to the coil, to the lens frame other than the lens frame to which the light controlling apparatus is joined, and by joining to the light controlling apparatus, it is possible to avoid the interference of the lens group and the coil.

Moreover, it is needless to mention that it is possible to replace the diaphragm plate in the second embodiment by an optical lens or by an optical filter similarly as in the first embodiment.

Third Embodiment

In a third embodiment, similarly as in the second embodiment, an optical system will be described by citing an example of an optical system in which, a light controlling apparatus is used. In the light controlling apparatus of the third embodiment, a variable aperture which regulates a light beam passing through an aperture by displacing a diaphragm plate in which the aperture is formed, to a position of an optical path and away from the optical path is driven by using an electromagnetic actuator.

Figure 5:
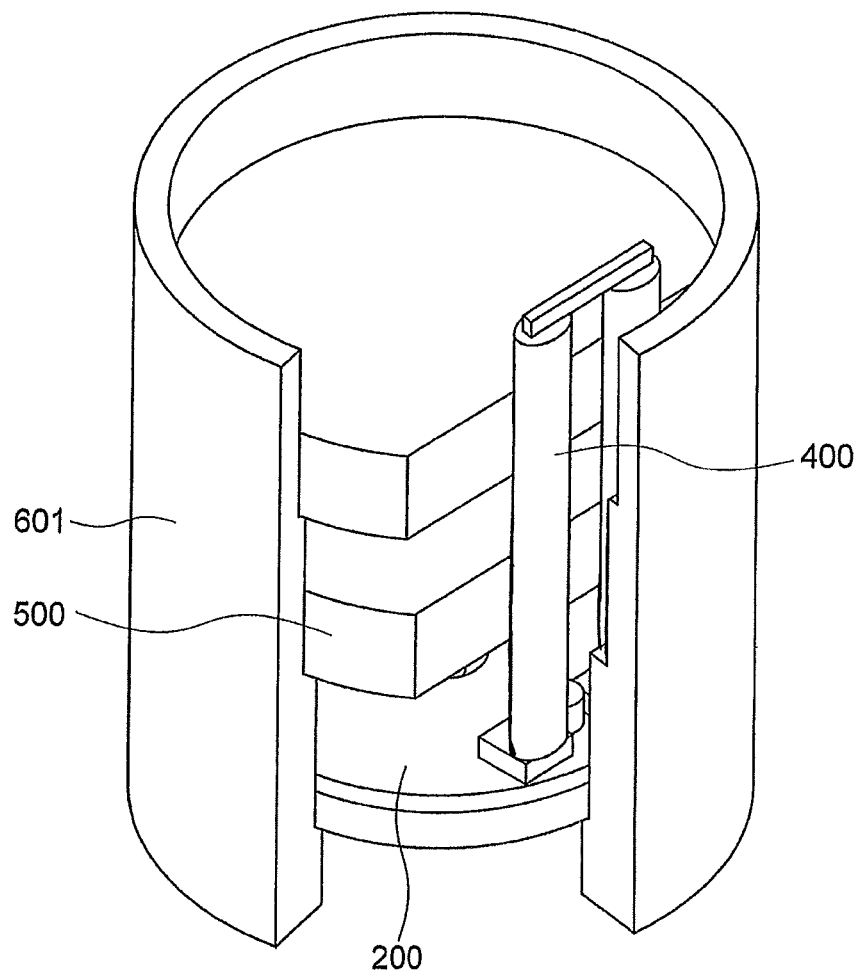
FIG. 5 is a perspective view (seen transparently) through a portion of a first lens frame according to a third embodiment of the present invention.

A structure and an effect of the optical system according to the third embodiment will be described below by using FIG. 5. FIG. 5 shows a perspective view when seen transparently through a portion of a first lens frame (lens barrel).

As shown in FIG. 5, the optical system according to the third embodiment differs from the optical system according to the second embodiment at a point that a portion of the lens of the lens group 500 is notched and that the lens group 500 is joined to first lens frame 601.

In the third embodiment, a portion of the lens of the lens group 500 is notched and a space is provided from the coil 400, and the lens group 500 and the coil 400 are installed to be parallel inside the lens frame 601. By the lens group 500 being joined to a lens frame 601 same as the lens frame 601 which joins the light controlling apparatus, it is possible to improve an accuracy of optical axis adjustment of the lens unit, as well as to simplify the assembly.

Other main effects are same as in the second embodiment.

Fourth Embodiment

In a fourth embodiment, similarly as in the second embodiment and the third embodiment, an optical system will be described by citing an example of an optical system in which, a light controlling apparatus is used. In the light controlling apparatus of the fourth embodiment, similarly as in the second embodiment and the third embodiment, a variable aperture which regulates a light beam passing through an aperture by displacing a diaphragm plate in which the aperture is formed, to a position of an optical path and away from the optical path is driven by using an electromagnetic actuator.

Figure 6:
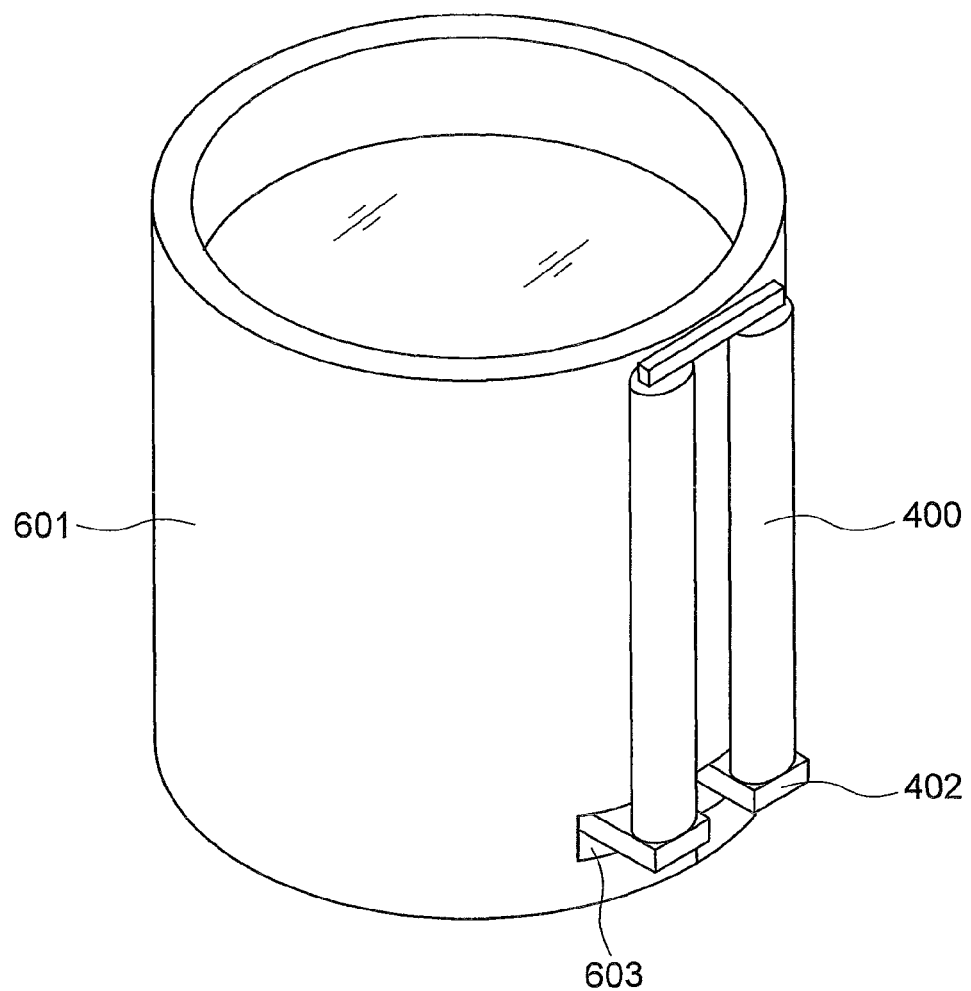
FIG. 6 is a perspective view of an optical system according to a fourth embodiment of the present invention.

A structure and an effect of the optical system according to the fourth embodiment will be described below by using FIG. 6. FIG. 6 shows a perspective view of the optical system according to the fourth embodiment.

As shown in FIG. 6, in the optical system according to the fourth embodiment, a through hole 603 is cut through the first lens frame 601. Moreover, the bending portion 402 of the coil 400 is inserted into the first lens frame 601 through the through hole 603, and the shaft member 301 which is joined to the diaphragm plate 300 inside the first lens frame 601 is formed oppositely to be disposed in-between. The fourth embodiment differs from the second embodiment and the third embodiment at a point that the coil is provided at an outer portion of the first lens frame 601.

The coil 400 being at the outside of the first lens frame 601, the reduction in diameter by that much amount than in the third embodiment cannot be realized. However, by letting the structure to be as in the fourth embodiment, cutting of the lens unit 500 is unnecessary, and moreover, the structure of the optical system can be formed without making changes in the conventional structure except for the first lens frame 601.

Other main effects are same as in the second embodiment.

Fifth Embodiment

In a fifth embodiment, similarly as in the embodiments from the second embodiment to the fourth embodiment, an optical system will be described by citing an example of an optical system in which, a light controlling apparatus is used. In the light controlling apparatus of the fifth embodiment, similarly as in the embodiments from the second embodiment to the fourth embodiment, a variable aperture which regulates a light beam passing through an aperture by displacing a diaphragm plate in which the aperture is formed, to a position of an optical path and away from the optical path is driven by using an electromagnetic actuator.

Figure 7:
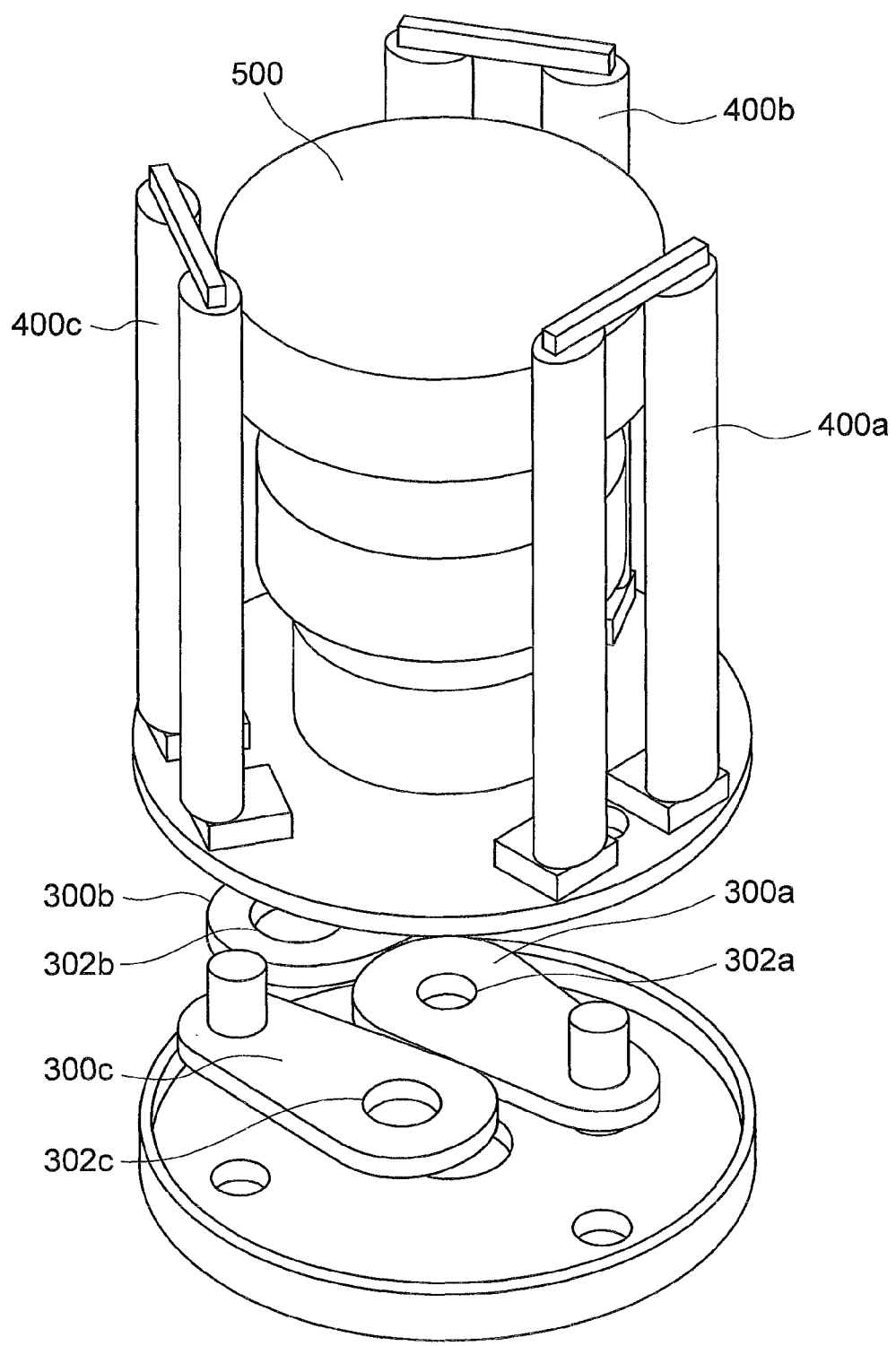
FIG. 7 is a perspective view of an optical system according to a fifth embodiment of the present invention.

A structure and an effect of the optical system according to the fifth embodiment will be described below by using FIG. 7. FIG. 7 is an exploded perspective view of the optical system according to the fifth embodiment. In the fifth embodiment, the second lens frame 602 is omitted.

As shown in FIG. 7, the optical system according to the fifth embodiment differs from the optical systems of the embodiments from the second embodiment to the fourth embodiment at a point that a plurality of coils 400a, 400b, and 400c and a plurality of diaphragm plates 300a, 300b, and 300c are provided. The total length of the coil in the fifth embodiment means the total length of the plurality of coils 400a, and 400b, and 400c.

By letting the optical system to have such structure, and by forming third apertures 302a, 302b, and 302c having different diameters, in the plurality of diaphragm plates 300a, 300b, and 300c respectively, and supplying a driving current one-by-one to the plurality of coils 400a, 400b, and 400c corresponding to the plurality of diaphragm plates 300a, 300b, and 300c, it is possible to realize a multi-stage aperture diameter.

Other main effects are same as in the second embodiment. Moreover, it is needless to mention that the structure of the optical system according to the fifth embodiment can be let to be similar to the structure of the optical systems according to the third embodiment and the fourth embodiment.

As it has been described above, the light controlling apparatus and the optical system according to the present invention are useful in a light controlling apparatus to be used in a small-size image pickup equipment, and are particularly suitable for a light controlling apparatus in which, further small-sizing and stable drive are sought.

The light controlling apparatus and the optical system according to the present invention show an effect that it is possible to provide a stable drive even when the size is made smaller, as the size of the coil which drives the diaphragm plate is independent of the outer dimension of the substrate of the light controlling apparatus.

What is claimed is:

1. A light controlling apparatus comprising:
    a substrate having an aperture;
    a light controlling section which includes at least one incident-light controlling means, having a magnet joined to a position of a center of rotation, and which rotates in a plane perpendicular to an optical axial direction, on the substrate; and
    at least one coil which imparts a rotational force to the magnet, wherein
    the incident-light controlling means is displaced to a position of the aperture and a retracted position of being retracted from the position of the aperture, by supplying an electric power, and
    in the light controlling apparatus in which, incident light which passes through the aperture is controlled, the coil is disposed to be extended in a direction parallel to an optical axis, wherein a length of the at least one coil is longer than an outer circumferential length of an outer edge of the substrate having the aperture.

2. The light controlling apparatus according to claim 1, wherein a total length of the coil is set to a length which enables to achieve a magnetic field which imparts to the magnet a rotational force for displacing the incident-light controlling means.

3. The light controlling apparatus according to claim 1, wherein for an aspect ratio of a cross-sectional shape in a plane perpendicular to the optical axial direction of the coil, a length in a circumferential direction is longer as compared to a length in a radial direction of a virtual circle having the optical axis as a center.

4. The light controlling apparatus according to claim 3, wherein a core of the coil is folded inward of a plane perpendicular to the optical axis, at a front-end portion joined to the substrate.

5. The light controlling apparatus according to claim 3, wherein a core of the coil has a flat surface portion which is extended in a plane perpendicular to the optical axis, at a front-end portion.

6. An optical system comprising:
    a light controlling apparatus according to claim 1, wherein
    at least one first optical element is disposed parallel to the coil.

7. The optical system according to claim 6, wherein the first optical element is held by a second lens frame which is provided separately from a first lens frame which holds the light controlling section and a second optical element.

8. The optical system according to claim 7, wherein the second lens frame is joined to the light controlling section.

9. The optical system according to claim 8, wherein the coil is held by the second lens frame.

10. The optical system according to claim 6, wherein
    the first optical element has a notch, and
    the first optical element is disposed parallel to the coil to include the coil in a notch area of the first optical element.

11. The optical system according to claim 6, wherein the coil is disposed to be extended in a direction parallel to the optical axial direction, out of the first lens frame which holds the light controlling section.

12. The light controlling apparatus according to claim 1, wherein an aperture is formed in the incident-light controlling means.

13. The light controlling apparatus according to claim 1, wherein a lens is formed in the incident-light controlling means.

14. The light controlling apparatus according to claim 1, wherein an optical filter is formed in the incident-light controlling means.

15. The light controlling apparatus according to claim 1, wherein the coil comprises a core and wherein the core is wound around by a coil wire.

* * * * *